(12) United States Patent
Haring

(10) Patent No.: US 6,905,298 B1
(45) Date of Patent: Jun. 14, 2005

(54) TELESCOPIC NUT

(76) Inventor: Joseph E. Haring, 542 Farmingdale Rd., Huntsville, AL (US) 35803

( * ) Notice: Subject to any disclaimer, the term of this patent is extended or adjusted under 35 U.S.C. 154(b) by 130 days.

(21) Appl. No.: 10/068,220

(22) Filed: Feb. 6, 2002

Related U.S. Application Data

(60) Provisional application No. 60/267,289, filed on Feb. 8, 2001.

(51) Int. Cl.⁷ ............................................... F16B 37/08
(52) U.S. Cl. ....................... 411/432; 411/178; 411/258; 411/366.1
(58) Field of Search ............................... 411/432, 433, 411/178, 366.1, 367, 258

(56) References Cited

U.S. PATENT DOCUMENTS

| | | | | |
|---|---|---|---|---|
| 2,374,548 A | * | 4/1945 | Leisure | 411/85 |
| 3,893,496 A | * | 7/1975 | Wallace et al. | 411/258 |
| 4,312,145 A | * | 1/1982 | Lukavich | 37/417 |
| 5,066,180 A | * | 11/1991 | Lang et al. | 411/103 |
| 5,288,191 A | * | 2/1994 | Ruckert et al. | 411/432 |
| 5,341,560 A | * | 8/1994 | Junkers | 29/525.08 |
| 5,492,388 A | * | 2/1996 | Kawasaki | 296/194 |
| 5,697,592 A | * | 12/1997 | Matheny et al. | 248/131.91 |
| 6,302,633 B1 | * | 10/2001 | Poe | 411/432 |

\* cited by examiner

*Primary Examiner*—Flemming Saether
*Assistant Examiner*—Jori Schiffman
(74) *Attorney, Agent, or Firm*—Mark Clodfelter

(57) ABSTRACT

A nut assembly is disclosed that will ensure that the shank of a bolt that features a measurable grip length will pass through the contact plane of adjoining members. The nut assembly also allows the desired compressive force in the adjoining members to be attained by using a telescopic feature of the nut to allocate additional thread action for the bolt, enabling the bolt to be drawn into the nut further than what would be allowed by a standard nut. The adaptability of the nut assembly can eliminate the need for washers or shims to adjust the shank penetration of the bolt. The nut assembly is useful for application in which the specified thread length and the grip length of the bolt is incompatable with the abutment thickness of the adjoining members.

13 Claims, 4 Drawing Sheets

TELESCOPIC NUT

CROSS REFERENCE TO RELATED APPLICATIONS

This application claims the benefit of provisional application No. 60/267,289, filed Feb. 8, 2001.

STATEMENT RELATING TO FEDERAL SUPPORT

This envetion was made without the use of any goverment resources.

FIELD OF THE INVENTION

This invention relates to fastener and fastener systems or the like used to secure two generally planar surfaces together, and particularly to a fastener assembly wherein an inner member contacts a thread/shank interface and allows an outer fastener member to continue past the thread/shank interface and contact one of the planar surfaces.

BACKGROUND OF THE INVENTION

The subject matter to which this invention pertains is in the field of fasteners. Bolts and screws are used in a wide variety of aerospace and aircraft applications to secure and attach components that feature at least one coplanar surface. In these applications, it is generally desirable to apply a predetermined torque to a bolt, whereby a state of tension exists state of compression exists in the fastened members. The typical bolt may feature a length of threads starting from the end opposite the head of the bolt and extending along the shaft of the bolt, the threads terminating at the shank of the bolt. The length of the shank, or smooth unthreaded portion of the shaft of the bolt between the threads and the head of the bolt, is defined as the grip length, or grip, in design vernacular. The shank is also typically where the maximum shear strength of the bolt is developed because of the larger, uninterrupted net section area in this region, as opposed to the broken surface of the threaded portion. Consequently, it is undesirable to place the threads of the bolt in the shear plane between two fastened surfaces because of the reduced strength of the bolt in the threaded region. Therefore, ensuring that the bolt shank is located and passes through the shear plane of any fastened members attains significant advantage. In addition, where the thread/shank interface of the bolt terminates at or extend slightly beyond the combined dimension of the two fastened members, there is a risk that a nut threaded onto the bolt will not sufficiently compress the two members together. Where this situation occurs, there is a temptation of a maintenance worker or fabricator to continue rotating the nut/bolt combination beyond the thread/shank interface of the bolt in an effort to tighten the joint. This may result in the bolt/nut being partially or fully stripped, with subsequent weakening the joint.

Presently, fastener systems that require the maximum bolt shear strength and the maximum member bearing strength, such as aircraft and aerospace applications, tend to need washers or shims place beneath the bolt and nut head to locate the bolt shank at the desired depth in the joint. Where a washer cannot fit within the confines of the joint, a special washer must be fabricated or the bolt strength must be compromised. In other cases, governing specifications that require the use of certain types and classes of bolts may limit the availability of thread length and grip length combinations. In these cases, the grip length of the bolt may exceed the joint thickness, in turn causing the bolt threads to terminate at the nut before the opposing members contact or before the appropriate compression can be applied to the joint members. The result can be normal and lateral movement between the members, which in turn reduces the quality of the joint.

Accordingly, it is one object of the invention to provide a general solution to this problem by allowing the thread/shank interface portion of the bolt to extend beyond the members to be joined to insure that the shank of the bolt is fully present at the shear plane between these members and that the appropriate amount of compression may be applied to the joint members. This is accomplished by providing additional thread between the bolt shank and the nut whereby the shank of the bolt is allowed to extend through the contact plane of the joined members, ensuring that the full shear strength of the bolt is attained and the appropriate amount of compression may be applied to the adjoining members.

SUMMARY OF THE INVENTION

A threaded nut assembly for conveniently being engaged to or disengaged from a bolt or screw is disclosed. The nut assembly, when engaged to the bolt, allocates additional thread to the bolt whereby continued rotation of the bolt along the bolt axis is enabled following abutment of the nut sleeve against the thread/shank interface of the bolt. The nut assembly is constructed having an inner sleeve member of generally cylindrical shape whose outer surface is threaded and mateable to the inner threads of the outer member, and further having an inner threaded bore mateable with a bolt. With this construction, the bolt may be placed through an opening in the members to be joined and into the nut assembly on the opposite surface. An operator rotates the bolt, overcoming the friction between the inner threads of the sleeve and the bolt threads to a depth where the thread/shank interface on the bolt abuts the threads at the end of the sleeve. Continued application of force between the bolt and nut causes the nut to then begin rotating about the sleeve, thereby causing additional translation of the bolt and nut toward respective opposite surfaces.

DETAILED DESCRIPTION OF THE INVENTION

Figure 1A:
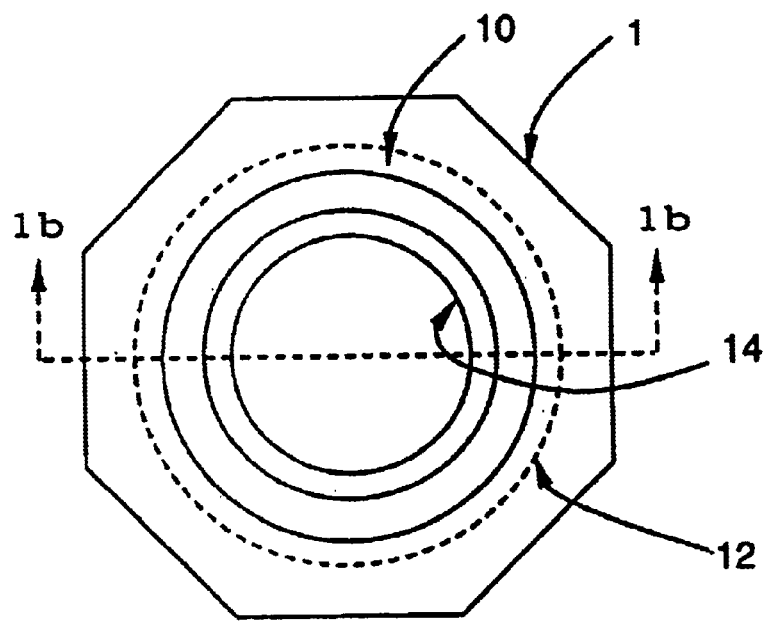
FIG. 1 shows two views of the nut assembly embodiment, the first being a top view and the second being a side view in cross section along lines 1—1.
Figure 1B:
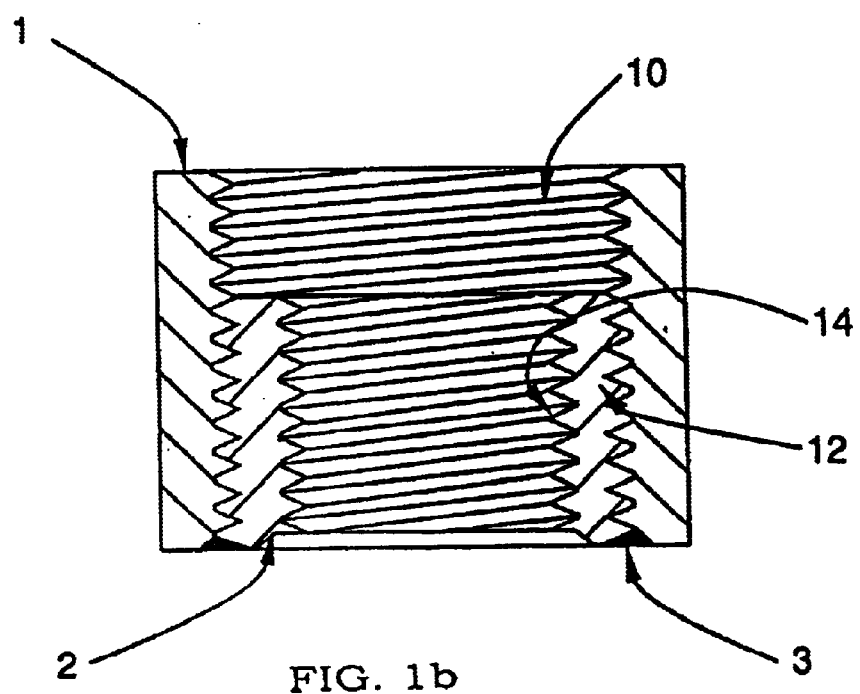

Referring to FIG. 1, a nut or similar fastener 1 is shown, nut 1 provided with an internal bore having threads 10 that would typically engage threads of a bolt. However, in the instant invention, a cylindrical sleeve-like member 2 is provided within nut 1, member 2 having external threads 12 that threadably engage internal threads 10 of nut 1. Member 2 is also provided with an internal bore provided with threads 14 adapted for threaded engagement with a bolt or other similar fastener. Threads 10, 12 and 14 are all cut in the same direction such that rotation direction of a bolt within the sleeve and rotation direction of the sleeve within the nut for advancement/retraction of the bolt/sleeve is the same direction. In other words, where a bolt is rotated clockwise to advance it into the sleeve, clockwise rotation of the sleeve will advance the sleeve into the nut. A temporary locking compound 3 may be provided between threads 10 and 12 in order to conveniently and temporarily lock the sleeve and nut together, as will be explained. Alternately, a mechanical clip or other device may be used to lock the sleeve and nut together. Such a clip may also provide a selected amount of tension between the sleeve and nut so that a predetermined amount of torque must be applied to the nut to effect relative rotation between the sleeve and nut. In another embodiment, the sleeve may be constructed slightly out-of-round or with other resistance against turning within the nut. This ensures that the sleeve will be tightened against the thread/shank interface of the bolt or other threaded member, with further rotation of the nut abutting a one of fastened members. Such a construction would also serve as a locking mechanism to lock the nut assembly and bolt or other threaded article together.

Figure 2A:
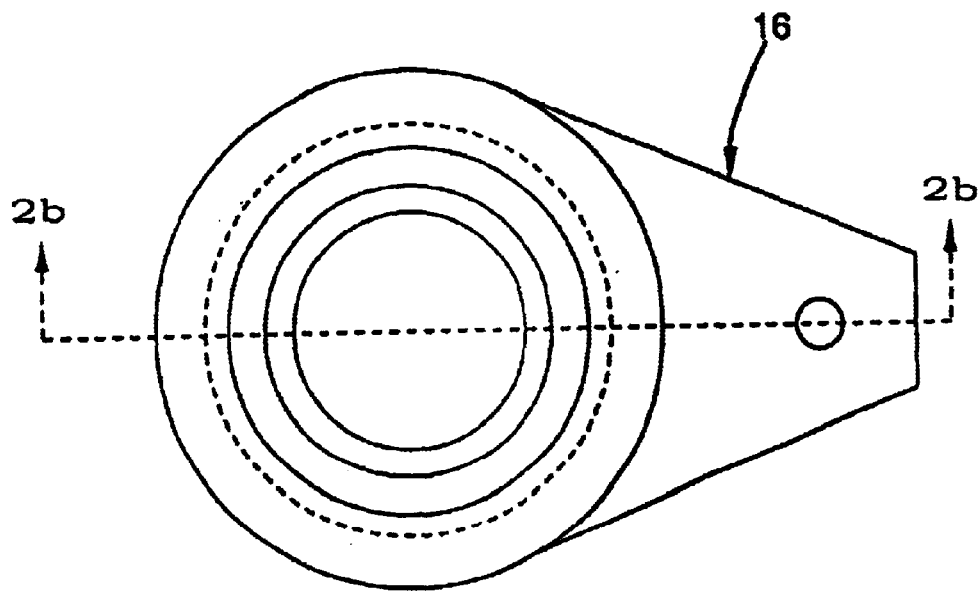
FIG. 2 shows two views of a rotationally locked nut assembly embodiment, the first being a top view and the second being a side view in cross section along lines 2—2.
Figure 2B:
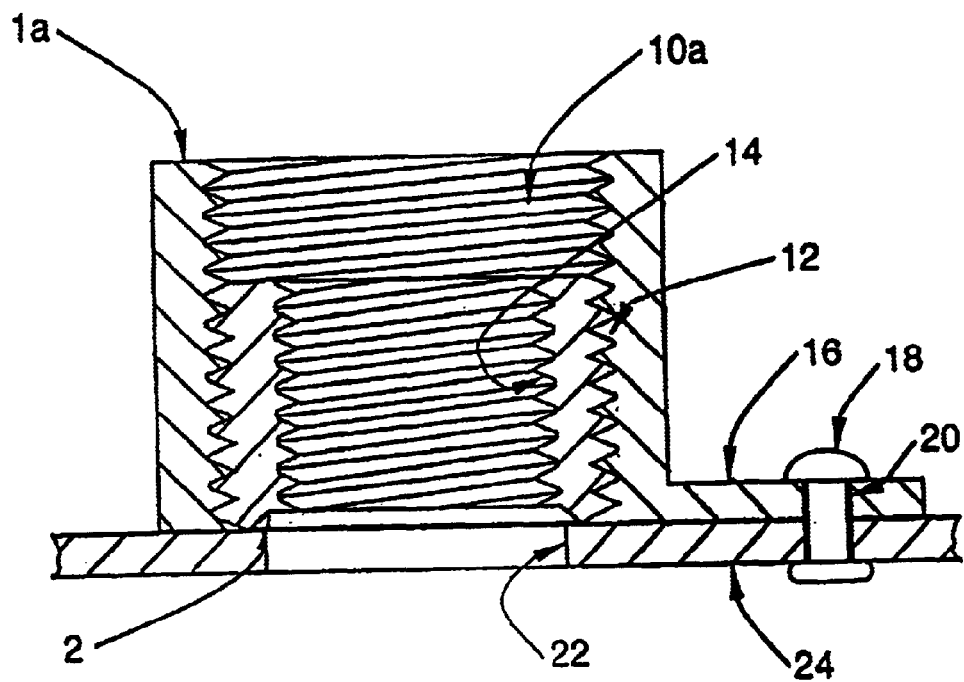

FIG. 2 shows a particularly configured nut 1*a* having a flange 16 in turn provided with an opening 18. As in the embodiment of FIG. 1, a sleeve 2 having exterior threads 12 and interior threads 14 is threaded into threads 10*a* of nut 1*a*. In this embodiment, a rivet or other fastener 18 may be passed through opening 20 in order to clamp nut 1*a* coaxial to an opening 22 in a member 24. Such an arrangement would be used where a nut would otherwise be installed in an inaccessable location.

Figure 3:
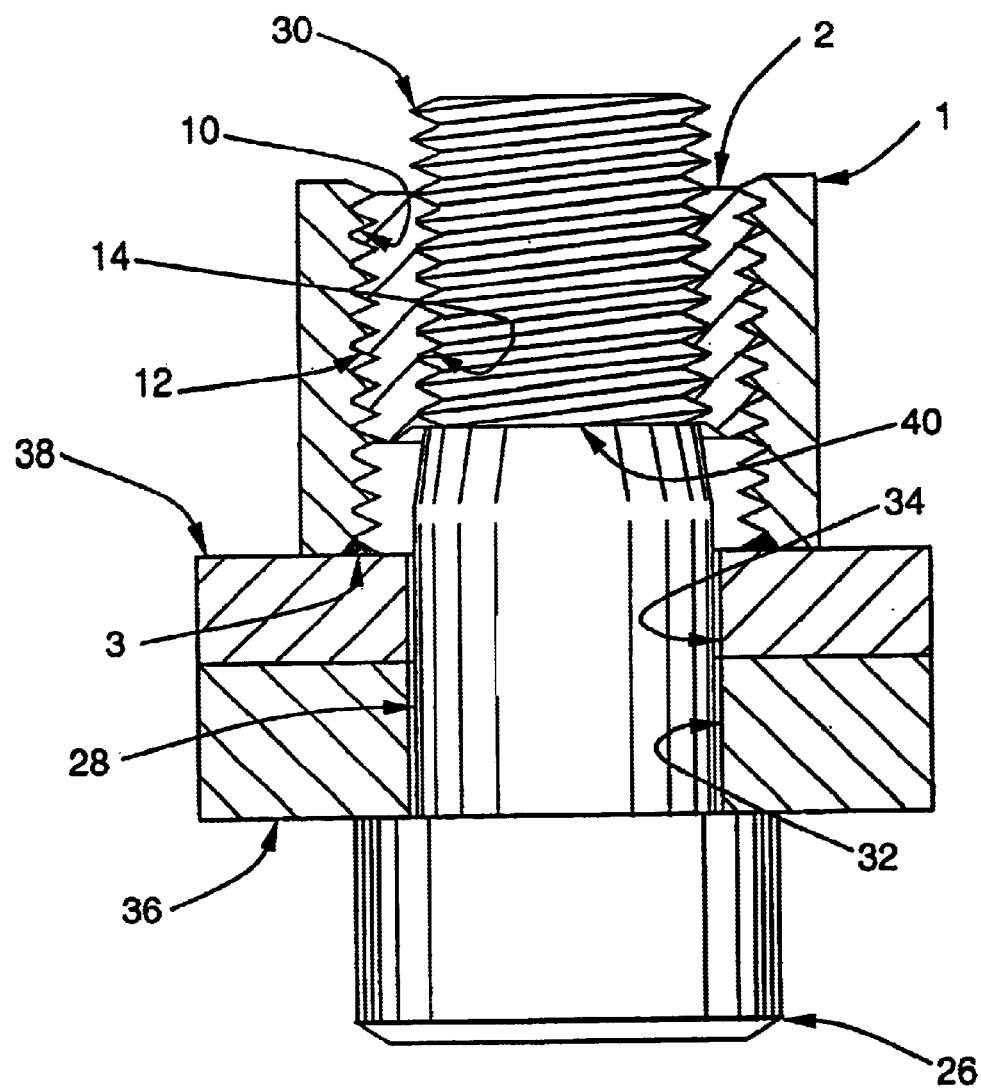
FIG. 3 is a side cross sectional view of the nut assembly with a bolt and two planar surfaces included to show the mechanism in its staged or tightened position.

FIG. 3 illustrates operation of the instant invention. Here, a bolt 26 having a shank portion 28 and threaded portion 30 is shown extending through coaxial openings 32 and 34 of planar members 36 and 38, respectively. It is to be noted that a thread/shank interface 40 of bolt 26 extends beyond members 36 and 38 in order to fully position the shank portion of the bolt within openings 32 and 34, as is desirable where shear forces exist between members 36 and 38. However, and as stated above, such positioning of the shank makes it impossible for a nut to fully compress members 36 and 38 together due to the nut being blocked from further advancement by the elevation of thread/shank interface 40 above opening 34.

In Applicant's invention, as the nut/sleeve combination as shown in FIG. 1 is rotated about the threaded portion 30 of bolt 26, sleeve 2 initially makes contact with the thread/shank interface and is blocked from further rotation and advancement onto bolt 26. At that point, further application of rotational force to the nut causes sleeve 2 to break free from the temporary locking compound 3, allowing the nut to rotate about the exterior threads 12 of sleeve 2 and advance beyond the thread/shank interface 40 of bolt 26. Upon contact with member 38, nut 1 may then be tightened to a specified torque, securing members 36 and 38 together.

Figure 4:
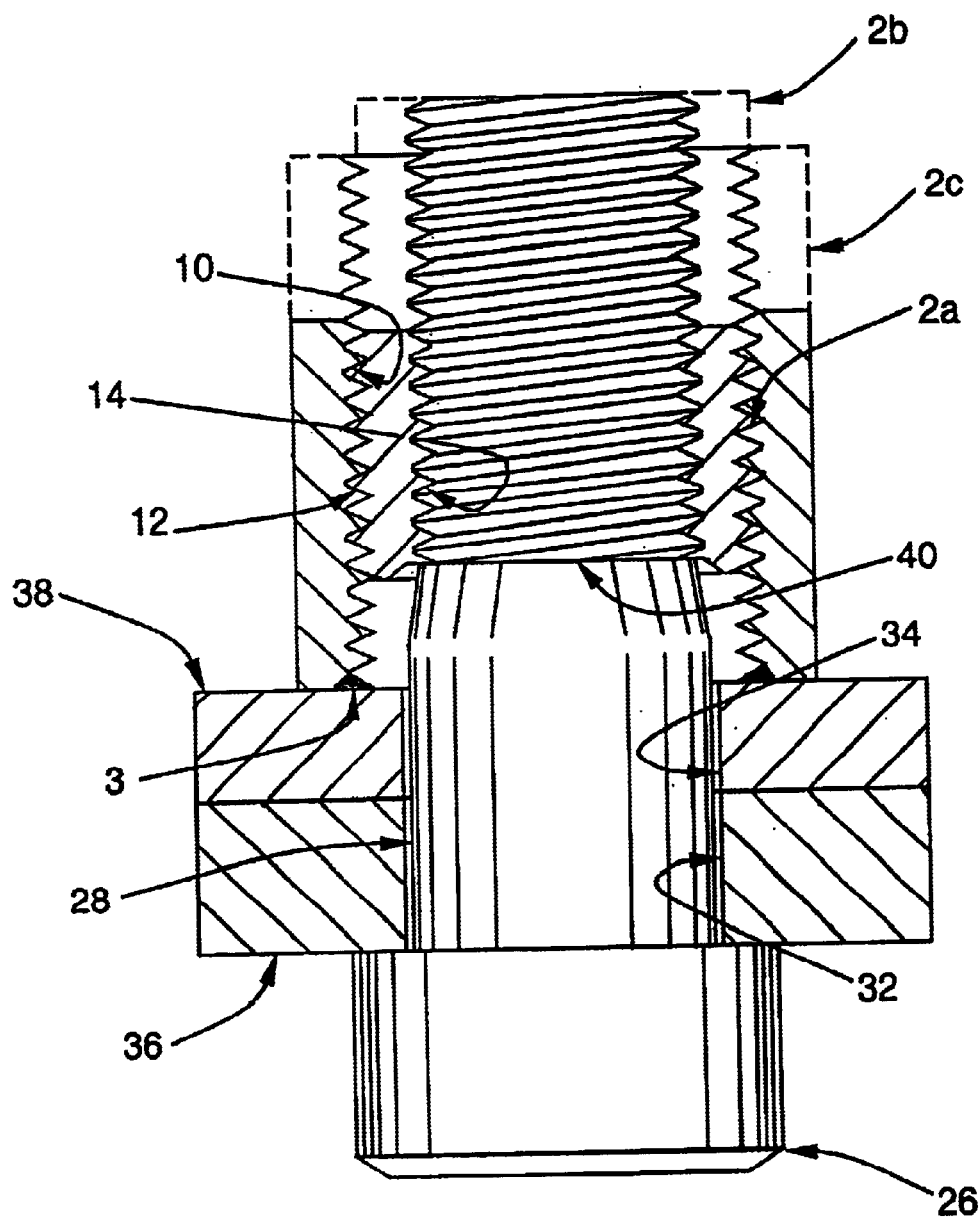
FIG. 4 is an assembled view of my new nut assembly clamping two workpiece members together, with dashed line showings of locking members.

While a specific embodiment is shown and described, it is to be understood that incidental changes may be made without departing from the scope of the invention. For instance, while sleeve 2 is shown as being generally shorter than the height of nut 1, a sleeve 2*a*, as shown in FIG. 4, could be the same height as the bore in the nut or greater so that a portion of the sleeve may extend beyond nut 1. In this instance, a second nut 2*b* (dashed lines) may be threaded on bolt 26 and secured against the extending end of sleeve 2*a*, firmly locking the entire assembly together and eliminating need for locking washers. Likewise, a nut 2*c* (dashed lines) may be threaded onto the extending portion of sleeve 2*a* to bear against nut 1, locking the assembly together. Either nut 2*b* or 2*c* could be used alone, or may be used together for additional locking strength.

After having thus described my invention and the manner of its use, it should be apparent that incidental changes may be made thereto that fairly fall within the scope of the following appended claims, wherein I claim:

1. A nut assembly for joining two or more workpieces together comprising:

a first fastener member having a first generally cylindrical inner bore provided with a first set of threads therein, a second fastener member provided with a second set of threads on an exterior surface thereof for threadable engagement with said first set of threads, said second fastener member having a second generally cylindrical inner bore provided with a third set of threads therein, said first set of threads, said second set of threads and said third set of threads all being cut in the same direction and being of approximately the same pitch, a threaded member having a shank including an unthreaded portion longer than coaxial bores in said workpieces through which said threaded member extends, said threaded member further having a conventional thread shank interface, whereby as said threaded member is threadably advanced into said third set of threads of said second fastener member, said third set of threads of said second fastener member contact said conventional thread/shank interface of said threaded member, with further relative advancement rotation between said first fastener member and second fastener member causing said first fastener member to be advanced past said conventional thread/shank interface of said threaded member and contact a said workpiece adjacent said nut assembly.

2. A nut assembly as set forth in claim 1 wherein said first fastener member and said second fastener member are attached by a temporary attachment so that said second fastener member initially makes contact with said conventional thread/shank interface, after which additional torque is required to break said attachment to advance said first fastener member past said conventional thread/shank interface.

3. A nut assembly as set forth in claim 2 wherein said attachment provides resistance to turning of said second fastener member whithin said first fastener member in a threaded direction so as to tighten said second fastener member against said conventional thread/shank interface.

4. A fastener as set forth in claim 1 wherein said attachment is a bonding agent.

5. A nut assembly as set forth in claim 1 wherein said threaded member is a conventionally configured bolt.

6. A nut assembly as set forth in claim 1 wherein said first fastener member is fixidly attached to an adjacent one of said workpieces, with rotation of said threaded member advancing said second fastener member to said conventional thread/shank interface, with further rotation of said threaded member tightening said second fastener member and compressing said workpieces together.

7. A fastener for use in conjunction with a conventional threaded member having a first set of threads and a shank including an unthreaded portion longer than openings in a workpiece through which said shank extends, said conventional threaded member further provided with a conventional thread/shank interface and comprising:

a fastener member having a first bore with a second set of threads therein, a generally cylindrical member having a second bore, with a third set of threads disposed in said second bore for threadably engaging said first set of threads of said conventional threaded member, and a fourth set of threads on an outer surface of said cylindrical member for threadably engaging said second set of threads of said fastener member, said first set of threads, said second set of threads, said third set of threads and said fourth set of threads being all cut in the same direction and of approximately the same pitch so that when said threads of said conventional threaded member are threadably advanced into said second bore, said unthreaded portion of said shank engages an end of said third set of threads of said cylindrical member and blocks further advancement of said cylindrical member, with further rotation of said conventional threaded member advancing said fastener member past said shank to be tightened against said workpiece.

8. A fastener as set forth in claim 7 further comprising an attachment coupling said fastener member and said cylindrical member together so that after said third set of threads of said cylindrical member contact said unthreaded portion of said shank, additional torque is required to break said attachment so that said fastener member may be advanced over said unthreaded portion of shank.

9. A fastener as set forth in claim 8 wherein said attachment provides resistance to turning of said cylindrical member within said fastener member in a direction to tighten said fastener.

10. A fastener as set forth in claim 8 wherein said cylindrical member extends beyond said fastener member when said conventional threaded member is tightened.

11. A fastener as set forth in claim 10 further comprising a locking member threadable onto an exterior portion of said cylindrical member, and threadably abuttable against said fastener member for locking said fastener member and said cylindrical member together.

12. A fastener as set forth in claim 10 wherein a threaded portion of said conventional threaded member extends beyond said cylindrical member, with a locking member threadable onto said conventional threaded member and threadably abuttable against said cylindrical member for locking said fastener member, said cylindrical member and said conventional threaded member together.

13. A fastener as set forth in claim 7 wherein said fastener member is affixed to an adjacent said workpiece so that rotation of said conventional threaded member tightens said fastener and said threaded member against said workpiece.

* * * * *